United States Patent
Lenz et al.

(10) Patent No.: US 9,302,634 B2
(45) Date of Patent: Apr. 5, 2016

(54) LOCAL HIGH VOLTAGE SAFETY INTERLOCK FOR HV COMPONENTS IN A VEHICLE WITH FEEDBACK TO THE VEHICLE SYSTEM

(71) Applicant: VISTEON GLOBAL TECHNOLOGIES, INC., Van Buren Township, MI (US)

(72) Inventors: Mario Lenz, Kerpen (DE); Stefan Tydecks, Köln (DE)

(73) Assignee: Hanon Systems, Daejeon-si (KR)

( * ) Notice: Subject to any disclaimer, the term of this patent is extended or adjusted under 35 U.S.C. 154(b) by 470 days.

(21) Appl. No.: 13/927,286

(22) Filed: Jun. 26, 2013

(65) Prior Publication Data

US 2014/0001840 A1     Jan. 2, 2014

(30) Foreign Application Priority Data

Jun. 27, 2012  (DE) .......................... 10 2012 105 631

(51) Int. Cl.
| | | |
|---|---|---|
| *B60L 1/00* | (2006.01) | |
| *B60R 16/02* | (2006.01) | |
| *B60R 16/03* | (2006.01) | |

(52) U.S. Cl.
CPC ................ *B60R 16/02* (2013.01); *B60R 16/03* (2013.01)

(58) Field of Classification Search
CPC ................................ B60R 16/02; B60R 16/03
USPC .......................................................... 307/9.1
See application file for complete search history.

(56) References Cited

U.S. PATENT DOCUMENTS

| | | | | |
|---|---|---|---|---|
| 2010/0123573 | A1* | 5/2010 | Cawthorne | .......... B60L 11/1838 340/532 |
| 2011/0037317 | A1* | 2/2011 | Kuschnarew | ....... B60L 11/1887 307/9.1 |
| 2011/0074595 | A1 | 3/2011 | Guo et al. | |
| 2013/0307326 | A1* | 11/2013 | Fassnacht | ............. B60L 3/0069 307/9.1 |

FOREIGN PATENT DOCUMENTS

| | | | | |
|---|---|---|---|---|
| DE | 19710416 | A1 | 9/1998 | |
| DE | 69320010 | T2 | 12/1998 | |
| DE | 10049196 | A1 | 4/2002 | |
| DE | 102008021542 | A1 | 11/2009 | |
| DE | 102008043909 | A1 | 5/2010 | |
| DE | 102010048348 | A1 * | 10/2010 | ........... G01R 31/025 |
| DE | 102009002991 | A1 | 11/2010 | |
| DE | 102011121849 | A1 * | 12/2011 | .............. B60R 16/03 |
| JP | 64-049418 | A | 2/1989 | |
| JP | 11-168367 | A | 6/1999 | |
| JP | 2002127741 | A | 5/2002 | |
| JP | 2002165466 | A | 6/2002 | |
| JP | 2010116024 | A | 5/2010 | |
| JP | 2011087350 | A | 4/2011 | |

* cited by examiner

*Primary Examiner* — Jared Fureman
*Assistant Examiner* — Duc M Pham
(74) *Attorney, Agent, or Firm* — Fraser Clemens Martin & Miller LLC; James D. Miller

(57) ABSTRACT

A high voltage (HV) safety lock for HV components in a vehicle has an HV plug, including a safety bridge arranged in the HV plug and connected to a central vehicle control via an internal bus system within the vehicle or a simple switched signal via a decentral control and regulating unit of an HV component. The safety bridge is connected to an LV power supply configured with electric isolation from the HV system.

20 Claims, 1 Drawing Sheet

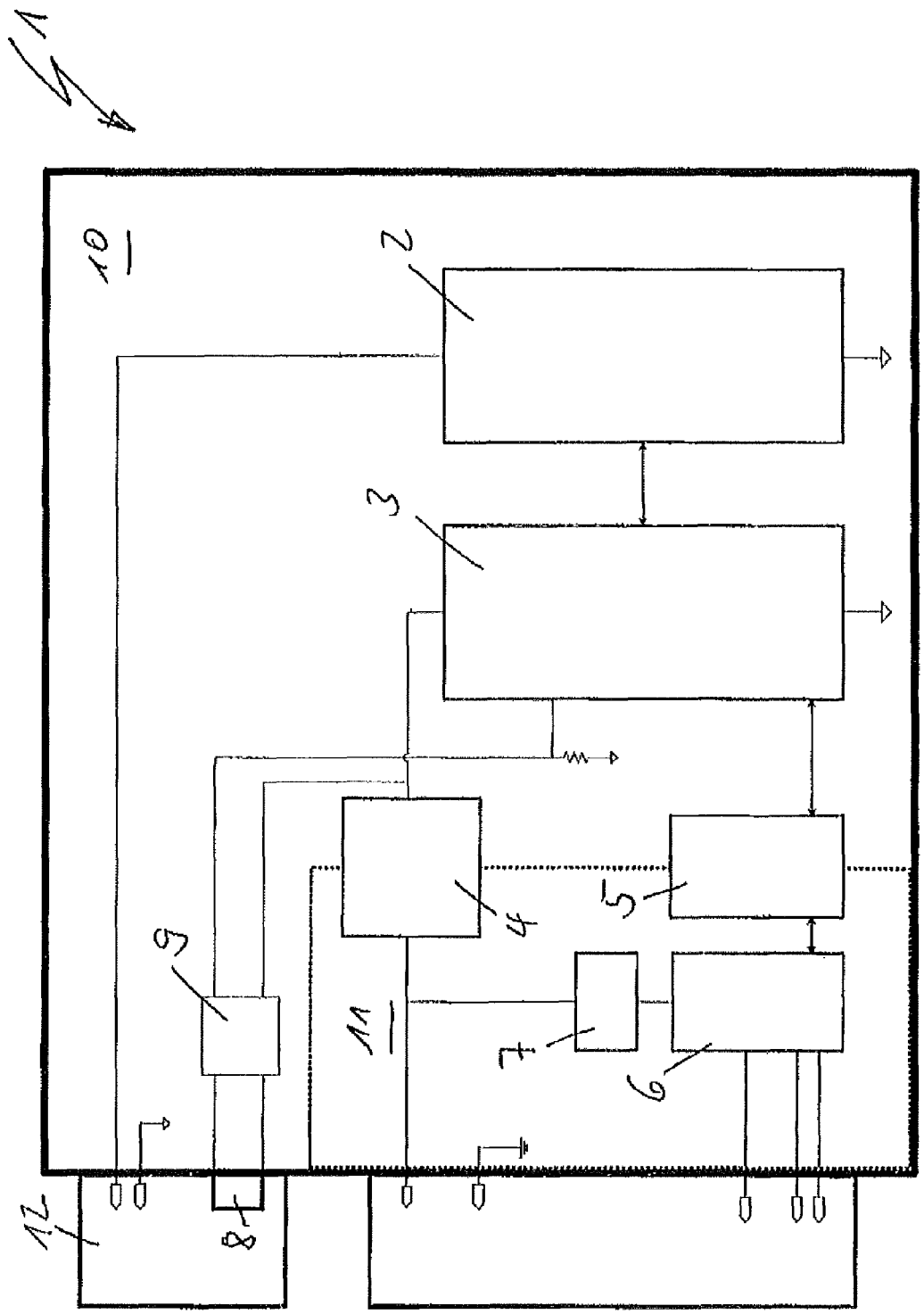

US 9,302,634 B2

LOCAL HIGH VOLTAGE SAFETY INTERLOCK FOR HV COMPONENTS IN A VEHICLE WITH FEEDBACK TO THE VEHICLE SYSTEM

CROSS-REFERENCE TO RELATED APPLICATION

This application claims priority to German Non-Provisional Patent Application Serial No. DE 10 2012 105 631.5 filed Jun. 27, 2012, hereby incorporated herein by reference in its entirety.

FIELD OF THE INVENTION

The invention relates to a local high volt (HV) safety lock for HV components in a vehicle, in particular for an electrically driven refrigerant compressor that provides a feedback message about faults or a failure of an HV component.

BACKGROUND OF THE INVENTION

The terms HV for high voltage and LV for low voltage are abbreviations as used below.

Operation of HV components in vehicles may lead to dangerous operating states when plugs or connections become loosened or when parts carrying electric voltage can be touched by people. In addition, a sudden interruption in the HV connection may cause damage to components and/or to the vehicle system due to the development of electric arcs such as those which can occur when there is a sudden interruption in high electric currents, for example. Furthermore, loss of the HV power supply may result in a failure of the HV component such that the vehicle system no longer receives a return message for diagnostic purposes.

According to prior art, such an electrical safety lock is implemented, for example, by looping a low voltage (LV) signal for the HV part of each component and each device. All these loops together form a serial connection or linkage for the lock signal, also known as an interlock signal. Then when an HV plug is unplugged or has contact problems, the entire loop is opened and active system, for example, the vehicle system will detect this stat and can then initiate suitable measures. These measures may consist of, for example, completely shutting down the HV system of the vehicle. A known implementation uses short-circuit bridges in the cable trees of the HV power supply of the vehicle which keep the loops that are supplied with power, via the LV plug, closed. Another method uses short-circuit bridges in the HV plugs of the various HV devices. Such approaches are known in DE 10 2010 048 348 A1 and in DE 10 2009 053 113 A1. A number of disadvantages are associated with the known systems.

Due to the series connection of the individual HV components in a loop, an interruption of this loop in a single component may lead to the downfall of the entire HV system because the various links are associated to one another via a link. It is then no longer readily possible to diagnose which component caused the failure.

Another problem is that the interlock lines which are at LV potential have been installed close to the HV high-current lines, which can lead to crosstalk of electromagnetic interference with the LV system, which is not usually shielded and therefore can cause inferior EMC performance. Furthermore, simply shutting down the HV circuit in the vehicle is not a suitable means for protecting the individual HV components and/or devices from damage, e.g., due to the development of electric arcs or contact-breaking sparks.

SUMMARY OF THE INVENTION

The object of the invention is to make available a high-voltage (HV) safety lock for HV components in a vehicle which will not lead to an interruption in the entire HV system in the event of trouble and yet will still meet the highest safety demands with regard to electromagnetic compatibility and with regard to electrostatic discharges.

In an embodiment of the invention, a high voltage (HV) safety lock for HV components in a vehicle having an HV plug is disclosed. A safety bridge is arranged in the HV plug and is connected via a decentral control and regulating unit of an HV component to a central vehicle control via an internal BUS system in the vehicle.

In an alternative embodiment, the safety bridge is connected to a central vehicle control via a simple switched signal by means of a decentral and regulating device of an HV component. The solution to this problem is in general that the LV power supply is always designed with electric isolation from the HV system A further embodiment of the invention consists of the fact that the HV component of the vehicle is an inverter of an electrical coolant compressor. The electric isolation of the LV power supply is advantageously designed as an optocoupler or an inductive or capacitive insulator.

An embodiment of the invention consists of the fact that the information transfer to the central automotive control system is designed to take place via LIN or CAN BUS systems. As an alternative to that, the information transfer to the central automotive control system is designed to take place via a switching transistor or a switching relay.

The embodiment according to the invention consists of the fact that the HV safety lock of the respective HV component is integrated decentrally into the individual local control and regulating device of HV components, and the information about the HV component is transmitted to the central vehicle control by way of the internal BUS systems within the vehicle. Thus additional local information about the disturbance is available in the central vehicle control and the interference or the effects thereof may be canceled and/or restricted in a targeted manner.

It is assumed that each HV plug has touch protection according to class IPxxB in the unplugged state in the vehicle system as well as for each HV component and that plug parts are not exposed to any hazardous voltage-carrying parts in the event of damage to the plug, for example, in an accident. It is especially advantageous that the vehicle system is informed only about the lack of integrity of the HV system in this component in the event of a lack of contact and does not directly shut down the entire HV system automatically. The vehicle system may then perform a suitable action on the basis of information about which HV component caused the fault. In addition, an HV shutdown sequence which protects the system or the components from damage may be performed in a targeted manner.

The advantages of the invention can be summarized as follows: only the function of the component causing the fault is influenced directly; a display of the HV integrity is made possible by means of an LV communication interface (for example, CAN, LIN); targeted shutdown routines for the HV component affected are made possible, for example, for slowing and shutting down an electrical refrigeration compressor to prevent permanent high voltage application to the defective HV connection; selective and adaptive measures of the vehicle system to the faults that occur may be initiated without having to shut down the entire HV system immediately; and crosstalk of electromagnetic interference from the HV system to the LV system is prevented or at least greatly reduced.

The advantages of the invention appear most obviously in the case of an unintentional interruption in the HV circuit of a vehicle having a high-voltage power supply. In this case, existing systems will simply shut down the HV voltage and all components supplied with HV will no longer function. The present invention permits a dedicated reaction to the interruption that occurs and crosstalk of electromagnetic interference form the HV system to the LV system is definitely reduced.

BRIEF DESCRIPTION OF THE DRAWINGS

Additional details, features and advantages of embodiments of the invention are derived from the following description of embodiments with reference to the accompanying drawing in which:

FIG. 1 illustrates a basic diagram of an HV component of a vehicle.

DETAILED DESCRIPTION OF EXEMPLARY EMBODIMENTS OF THE INVENTION

The following detailed description and appended drawings describe and illustrate various exemplary embodiments of the invention. The description and drawings serve to enable one skilled in the art to make and use the invention, and are not intended to limit the scope of the invention in any manner.

The components illustrated in FIG. 1 are explained in greater detail below according to an embodiment of the invention.

The refrigerant compressor is driven by a power stage 2 of an inverter 1, the power stage 2 being arranged in an HV area 10 and operated at a high voltage. The power stage 2 is controlled by a microprocessor 3, which is supplied with power by an LV power supply 4 via a galvanically separated voltage supply. The LV power supply 4 and an electric isolation 5 of the communication interface as well as a bus driver 6 and the bus driver power supply 7 are all arranged in an LV area 11. A local electrically conductive safety bridge 8, which is additionally equipped with an EMC-ESD safety component 9, is provided in an HV plug 12.

The LV power supply 4 ensures that the microprocessor 3 is supplied with 5 V power from a 12 V low-voltage source. In this way, the microprocessor 3, which is essential for communication via the bus system, which can be a LIN bus system or a CAN bus system, or simple switched signals, continues to function, even if the HV power supply is interrupted. It is thus possible for the fault state to be reported back to the vehicle system if the HV plug 12 is unplugged.

The bus driver 6 is designed as a driver module, for example, as a CAN or LAN transceiver which physically adapts the communication signals of the inverter 1 to the corresponding bus. The bus driver 6 can be supplied with 12 V potential (e.g. an LIN transceiver) or 5 V potential (e.g. a CAN transceiver) with respect to the ground connection (or GND) of the LV area 11. The microprocessor 3 is supplied with a 5 V potential with respect to the ground connection (or GND) of the HV area 10. Due to these varying voltage potentials, an electric isolation 5 is provided. The electric isolation 5 is a module designed as a digital insulator or as an optocoupler, for example, and ensures the electric isolation between the bus driver 6 and the microprocessor 3.

In the HV plug 12, a short-circuit bridge, also referred to as an electrically conductive safety bridge 8, is provided, pulling the input of the microprocessor 3 to the level of the microprocessor power supply, i.e., a "high" signal, in the event of correct operation with the HV plug 12 plugged in If the HV plug 12 is pulled out, thereby interrupting the current path via the electrically conductive safety bridge 8, then the pull-down resistor, as shown, pulls the microprocessor 3 input to "low."

A pull-down resistor is understood to be a resistor which connects a signal line to a ground connection or GND of the microprocessor 3. If there is no other potential on the signal line, then the pull-down resistor will pull the signal line to GND potential and the microprocessor 3 will detect a "low" signal at the input.

Alternatively, the inverse case is also implemented, namely in which a pull-up resistor causes the microprocessor 3 input to go to "high" as soon as the electrically conductive safety bridge 8 in the HV plug 12 has been interrupted and the electrically conductive safety bridge 8 then goes to ground. The pull-up resistor is logically similar to the pull-down resistor except that the resistor connects the signal line to the positive power supply voltage of the microprocessor 3. If there is no other potential on the signal line, then the pull-up resistor will pull the signal line up to the potential of the power supply voltage and the microprocessor 3 will detect a "high" signal at the input.

Since the electrically conductive safety bridge 8 in the HV plug 12 is in direct proximity to the high-current contacts, there may be crosstalk from interference there. In the case of the unplugged HV plug 12, the interlock contacts can also be touched from the outside, for example, during service in the shop, For this reason, the "interlock path" must be protected from electromagnetic interference and electrostatic discharge by the EMC-ESD safety component 9.

From the foregoing description, one ordinarily skilled in the art can easily ascertain the essential characteristics of this invention and, without departing from the spirit and scope thereof, can make various changes and modifications to the invention to adapt it to various usages and conditions.

LIST OF REFERENCE NUMERALS

1 Inverter
2 Power stage
3 Microprocessor
4 LV power supply with electric isolation
5 Electric isolation; optocoupler
6 Bus driver
7 Bus driver power supply
8 Electrically conductive safety bridge, short-circuit bridge
9 EMC-ESD safety component
10 HV area
11 LV area
12 HV plug

What is claimed is:
1. A high-voltage safety interlock for HV components in a vehicle comprising:
an HV plug configured for electrical communication with an HV power supply and connected to an LV power supply, wherein the LV power supply is configured to be electrically isolated from the HV power supply; and
a safety bridge disposed in the HV plug, the safety bridge is configured to be in signal communication with a central vehicle control of the vehicle through at least one of an internal bus system through a decentral control and regulating unit of an HV component within the vehicle and a simple switched signal through a decentral control and regulating unit of the HV component.

2. The high-voltage safety interlock for HV components in a vehicle according to claim 1, wherein the HV component of the vehicle is an inverter of an electrical refrigerant compressor.

3. The high-voltage safety interlock for HV components in a vehicle according to claim 1, wherein the LV power supply is electrically isolated from the HV power supply through an electric isolation, wherein the electric isolation is an optocoupler.

4. The high-voltage safety interlock for HV components in a vehicle according to claim 1, wherein the internal bus system is at least one of an LIN bus system and a CAN bus system.

5. The high-voltage safety interlock for HV components in a vehicle according to claim 1, wherein the safety bridge is in signal communication with the central automotive control system through a switching transistor or a switching relay.

6. The high-voltage safety interlock for HV components in a vehicle according to claim 1, wherein the safety bridge is in signal communication with a microprocessor and a pull-down resistor through a signal line, the pull-down resistor connecting the signal line to a ground connection of the microprocessor.

7. The high-voltage safety interlock for HV components in a vehicle according to claim 6, wherein the pull-down resistor is configured to pull an input of the microprocessor to a low signal input.

8. The high-voltage safety interlock for HV components in a vehicle according to claim 1, wherein the safety bridge is in signal communication with a microprocessor and a pull-up resistor through a signal line, the pull-up resistor connecting the signal line to a positive power supply voltage of the microprocessor.

9. The high-voltage safety interlock for HV components in a vehicle according to claim 8, wherein the pull-up resistor is configured to pull an input of the microprocessor to a high signal input.

10. The high-voltage safety interlock for HV components in a vehicle according to claim 1, further comprising an EMC-ESD safety component in electrical communication with the safety bridge and configured to prevent an interference and an electrostatic discharge between the HV power supply and the LV power supply.

11. The high-voltage safety interlock for HV components in a vehicle according to claim 1, wherein the HV component has a high voltage area and a low voltage area.

12. The high-voltage safety interlock for HV components in a vehicle according to claim 1, wherein the HV plug is configured to interrupt a current across the safety bridge.

13. A high-voltage safety interlock for HV components in a vehicle comprising:
   an HV plug configured for electrical communication with an HV power supply and connected to an LV power supply, wherein the LV power supply is configured to be electrically isolated from the HV power supply through an optocoupler; and
   a safety bridge disposed in the HV plug, the safety bridge is configured to be in signal communication with a central vehicle control of the vehicle through at least one of an internal bus system through a decentral control and regulating unit of an HV component within the vehicle and a simple switched signal through a decentral control and regulating unit of the HV component.

14. The high-voltage safety interlock for HV components in a vehicle according to claim 13, wherein the HV component of the vehicle is an inverter of an electrical refrigerant compressor.

15. The high-voltage safety interlock for HV components in a vehicle according to claim 13, wherein the internal bus system is at least one of an LIN bus system and a CAN bus system.

16. The high-voltage safety interlock for HV components in a vehicle according to claim 13, wherein the safety bridge is in signal communication with the central automotive control system through a switching transistor or a switching relay.

17. The high-voltage safety interlock for HV components in a vehicle according to claim 13, wherein the safety bridge is in signal communication with a microprocessor and a pull-down resistor through a signal line, the pull-down resistor connecting the signal line to a ground connection of the microprocessor and is configured to pull an input of the microprocessor to a low signal input.

18. The high-voltage safety interlock for HV components in a vehicle according to claim 13, wherein the safety bridge is in signal communication with a microprocessor and a pull-up resistor through a signal line, the pull-up resistor connecting the signal line to a positive power supply voltage of the microprocessor and is configured to pull an input of the microprocessor to a high input.

19. The high-voltage safety interlock for HV components in a vehicle according to claim 13, further comprising an EMC-ESD safety component in electrical communication with the safety bridge and configured to prevent an interference and an electrostatic discharge between the HV power supply and the LV power supply.

20. A high-voltage safety interlock for HV components in a vehicle comprising:
   an HV plug configured for electrical communication with an HV power supply and connected to an LV power supply, wherein the LV power supply is configured to be electrically isolated from the HV power supply through an optocoupler;
   a safety bridge disposed in the HV plug, the safety bridge is configured to be in signal communication with a central vehicle control of the vehicle through at least one of an internal bus system through a decentral control and regulating unit of an HV component within the vehicle and a simple switched signal through a decentral control and regulating unit of the HV component; and
   an EMC-ESD safety component in electrical communication with the safety bridge and configured to prevent an interference and an electrostatic discharge between the HV power supply and the LV power supply.

* * * * *